(12) United States Patent
Lloyd (10) Patent No.: US 12,430,418 B2
(45) Date of Patent: Sep. 30, 2025

(54) AUTHENTICATION CONTROL OF AN INDUSTRIAL ASSET

(71) Applicant: Schneider Electric USA, Inc., Andover, MA (US)

(72) Inventor: Chad Andrew Lloyd, Andover, MA (US)

(73) Assignee: Schneider Electric USA, Inc., Boston, MA (US)

( * ) Notice: Subject to any disclaimer, the term of this patent is extended or adjusted under 35 U.S.C. 154(b) by 230 days.

(21) Appl. No.: 18/077,975

(22) Filed: Dec. 8, 2022

(65) Prior Publication Data

US 2024/0193248 A1 Jun. 13, 2024

(51) Int. Cl.
G06F 21/40 (2013.01)

(52) U.S. Cl.
CPC ................... G06F 21/40 (2013.01)

(58) Field of Classification Search
CPC .......................................... G06F 21/40
See application file for complete search history.

(56) References Cited

U.S. PATENT DOCUMENTS

| | | | | |
|---|---|---|---|---|
| 9,092,600 | B2* | 7/2015 | Scavezze | H04L 63/08 |
| 9,977,882 | B2* | 5/2018 | Scavezze | H04W 12/06 |
| 11,449,841 | B1* | 9/2022 | Srinivasarangan | G06Q 20/30 |
| 2012/0066349 | A1* | 3/2012 | Trotter | H04L 63/0853 |
| | | | | 709/219 |
| 2014/0125574 | A1* | 5/2014 | Scavezze | G06F 21/34 |
| | | | | 345/156 |
| 2015/0143496 | A1* | 5/2015 | Thomas | G06F 21/40 |
| | | | | 726/7 |
| 2015/0324562 | A1* | 11/2015 | Scavezze | G06F 21/36 |
| | | | | 345/156 |
| 2018/0232937 | A1* | 8/2018 | Moyer | G06T 15/005 |
| 2018/0309808 | A1* | 10/2018 | Andon | G06T 19/20 |
| 2019/0028484 | A1* | 1/2019 | Truong | H04L 9/3271 |
| 2019/0081947 | A1* | 3/2019 | Faris | G06Q 30/0214 |
| 2019/0147655 | A1* | 5/2019 | Galera | G06T 15/20 |
| | | | | 345/419 |
| 2019/0278993 | A1* | 9/2019 | Hoover | G06V 20/20 |
| 2019/0325660 | A1* | 10/2019 | Schmirler | G06F 3/011 |

(Continued)

OTHER PUBLICATIONS

International Search Report and Written Opinion for PCT Patent Application No. PCT/US2023/82931, dated Mar. 12, 1024.

*Primary Examiner* — Jimmy H Tran (57) ABSTRACT

A method is provided for providing an interface via an AR display for an operator to interact with displayed interactive graphical elements (IGEs) corresponding to respective actual components of a physical asset, wherein the interface is configured for the operator to control a selected actual component using a corresponding IGE, determining, responsive to detected user interaction with the corresponding IGE, whether the selected controllable actual component is designated as sensitive, and responsive to a determination that the selected controllable actual component is designated as sensitive, requiring enhanced multifactor authentication (MFA) to establish that the local user is local to the asset using a first factor of the enhanced MFA and that the local user is authenticated using a second factor of the enhanced MFA, and allowing control of the sensitive actual component based on receipt of proof of authentication of the local user by the enhanced MFA.

20 Claims, 6 Drawing Sheets

(56) References Cited

U.S. PATENT DOCUMENTS

| | | | | |
|---|---|---|---|---|
| 2019/0332751 | A1* | 10/2019 | Brady | G06V 10/761 |
| 2020/0051080 | A1* | 2/2020 | Maheshwari | H04L 9/3234 |
| 2020/0366670 | A1* | 11/2020 | Cordiner | H04W 12/64 |
| 2021/0073370 | A1* | 3/2021 | Green | G06F 21/602 |
| 2021/0089639 | A1* | 3/2021 | Remillet | G06F 21/32 |
| 2021/0150014 | A1* | 5/2021 | Edwards | G06F 40/279 |
| 2021/0326428 | A1* | 10/2021 | Edwards | G06V 20/20 |
| 2021/0373676 | A1* | 12/2021 | Jorasch | G06F 3/038 |
| 2022/0197989 | A1* | 6/2022 | Rakshit | G06F 3/017 |
| 2022/0277090 | A1* | 9/2022 | Narita | G06F 21/40 |
| 2022/0335392 | A1* | 10/2022 | Srinivasarangan | G07F 19/20 |
| 2022/0398301 | A1* | 12/2022 | Sloane | H04L 65/1083 |
| 2022/0414202 | A1* | 12/2022 | Tourani | G06F 21/35 |
| 2022/0414272 | A1* | 12/2022 | Karri | G06F 21/84 |
| 2023/0130648 | A1* | 4/2023 | Bryant | G06F 21/36 |
| | | | | 726/18 |
| 2023/0135750 | A1* | 5/2023 | Spoerri | G06T 19/006 |
| | | | | 705/319 |
| 2023/0306099 | A1* | 9/2023 | Redmond | G06F 21/32 |
| 2023/0418365 | A1* | 12/2023 | Alexander | H04L 65/612 |
| 2024/0004456 | A1* | 1/2024 | Todasco | G06F 3/011 |
| 2024/0114023 | A1* | 4/2024 | Kosciej | H04L 63/0861 |
| 2024/0250943 | A1* | 7/2024 | Simakov | G06F 21/554 |
| 2024/0289833 | A1* | 8/2024 | Faris | G06Q 30/0233 |

* cited by examiner

AUTHENTICATION CONTROL OF AN INDUSTRIAL ASSET

TECHNICAL FIELD

The present disclosure relates to application of augmented reality to a physical asset, and more particularly, to authentication for control of the physical asset via augmented reality.

BACKGROUND

Augmented reality (AR) can be used with physical assets, such as industrial assets. For example, AR can be used to display a view of industrial asset (such as an industrial cabinet, machine, or plant). The displayed information can include a real time image of the asset with superimposed data, such as real time and/or or historical data associated with a particular component of the asset. Physical assets, such as industrial assets, can be subject to harsh conditions and provided with protective enclosures that obscure the view of a human operator. Any human operator that enters a vicinity of the industrial asset may be required to don personal protective equipment (PPE). Thus each time that the operator has a need to interact with the industrial asset, such as to check gauges or make an adjustment, the operator needs to put on the cumbersome PPE. However, the availability of AR allows the operator to safely view the industrial asset, even from a remote location. The view provided by AR can include an internal view of the physical asset, even as if its protective enclosures were open.

Physical assets can include critical or sensitive components that are subject to operational risk, regulatory requirements, and other safety considerations. For this reason, AR is not considered safe for use with control applications of such assets.

Conventional methods and systems for application of AR to physical assets, such as industrial assets, have generally been considered satisfactory for their intended purpose. However, there is still a need in the art for safety features to ensure secure access to critical or sensitive components of a physical asset via AR.

SUMMARY

In accordance with a purpose of the illustrated embodiments, in one aspect, a method of authenticating control of a physical asset that has actual components implemented in at least one processor is provided. The method includes causing display of an interactive augmented reality (AR) display of the physical asset responsive to local user input data from a local user and providing an interface via the AR display for an operator to interact with displayed interactive graphical elements (IGEs) that correspond to the respective actual components of the physical asset. The interface is configured for the operator to control a selected actual component of the actual components using a corresponding IGE, the operator being the local user or a different user. The method further includes determining, responsive to detected user activity interaction with the corresponding IGE, whether the selected controllable actual component is designated as sensitive and responsive to a determination that the selected controllable actual component is designated as sensitive, requiring enhanced multifactor authentication (MFA). The enhanced MFA establishes that the local user is local to the asset using a first factor of the enhanced MFA and establishing that the local user is authenticated using a second factor of the enhanced MFA. The method further includes allowing control of the sensitive actual component based on receipt of proof of authentication of the local user by the enhanced multifactor authentication.

In one or more embodiments, the local user input data can include field of view (FOV) data that represents the FOV of a camera when the FOV overlaps at least a portion of the asset, and the AR display corresponds to the FOV data.

In one or more embodiments, it may be unsafe, impracticable, or impossible to physically access the controllable actual component for controlling the controllable actual component.

In one or more embodiments, each of the first and second factors for the enhanced multifactor authentication can include a personal possession factor, a biometric factor, or a personal knowledge factor.

In one or more embodiments, the first and second factors can be verified using a single discrete authentication device.

In one or more embodiments, the enhanced MFA can require that establishing the first and second factors occur within a predefined time window.

In one or more embodiments, the operator can be the different user, and one of the local user and the operator can supervise the other of the local user and the operator and can provide approval that is required for controlling the sensitive actual component, and/or a supervisor that is different from the operator can supervise the operator and can provide approval that is required for controlling the sensitive actual component.

In one or more embodiments, one of the first and second factors can be verified by a device that provides the local user input data, and the other of the first and second factors can be verified by the physical asset.

In accordance with further aspects of the disclosure, a computer system is provided that performs the disclosed method. In accordance with still further aspects of the disclosure a non-transitory computer readable storage medium and one or more computer programs embedded therein is provided, which when executed by a computer system, cause the computer system to perform the disclosed method.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

The present disclosure provides a system and method for providing authentication to control an asset (e.g., an industrial asset) via application of augmented reality (AR). A local user device having a camera is directed at the asset. An internal view of the asset that corresponds to the region of the asset in the field of view (FOV) of the camera is displayed on the local user device (and optionally on one or more remote user devices) via AR. This display is referred to as the AR display and includes interactive features. Graphical elements in the AR display are interactive graphical elements (IGE), which are referred to as AR IGEs. The AR IGEs correspond to respective actual components of the asset, wherein the actual component can be interior to the asset. The AR display is configured to be interactive and to provide an interface for a user to select an AR IGE that corresponds to an actual component to view information about the actual component. When the actual component is controllable, the user can request control of the actual component using the corresponding AR IGE.

An AR IGE that can be used to control a controllable actual component is referred to as a controllable AR IGE. Using a controllable AR IGE to control a remote controllable component causes generation of a control request. The control request is buffered without allowing implementation of the requested control. A determination is made, responsive to the control request and while the control request is buffered, whether the corresponding controllable actual component has been designated as a sensitive component for which enhanced multifactor authentication (MFA) is required as a condition for acquiring control. If it is determined that the controllable component is sensitive, meaning enhanced MFA is required for acquiring control, control is not allowed until the enhanced MFA requirements are satisfied for the local user operating the local user device. Additional requirements may require coordination with another user, such as a remote operator to operate the AR display for requesting control of the sensitive component and/or a supervisor, per the MFA requirements. The enhanced MFA authentication can include submission and authentication of a biometric factor or personal knowledge factor connected to the local user and establishment that the local user is present at the location of the asset. Verification of the required factors can be required to be performed at the local user device, the physical asset, or both.

Although verification is needed that the local user is present at the location of the asset, the local user can be disposed behind a protective divider, such as a transparent wall, via which the local user can operate the camera of the local user device for the camera's FOV to overlap with the asset.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Figure 1A:
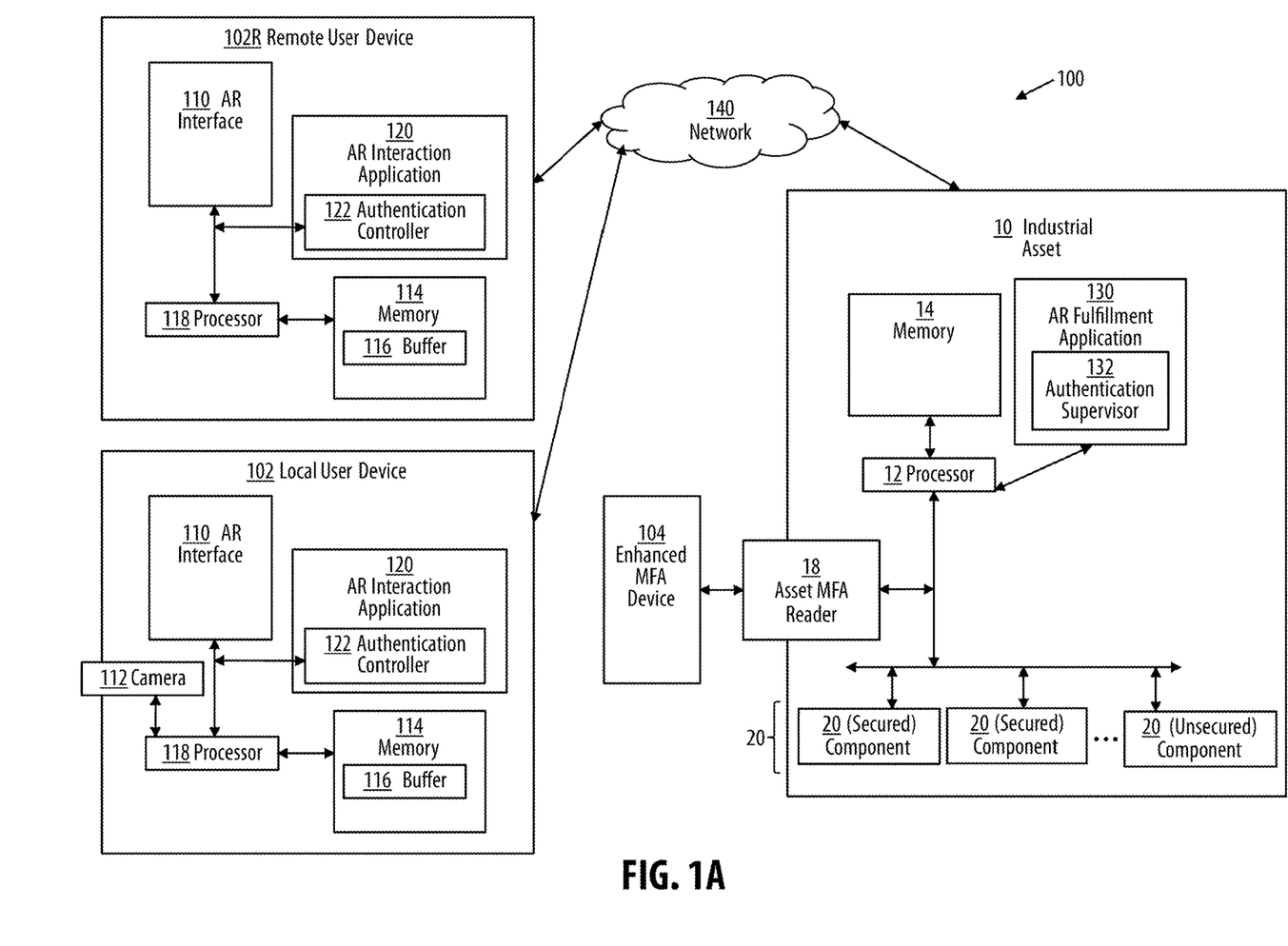
FIG. 1A is a block diagram illustrating an example industrial augmented reality (AR) system operating local to an industrial asset, in accordance with an aspect of the disclosure.

Reference will now be made to the drawings. For purposes of explanation and illustration, and not limitation, a block diagram of an exemplary embodiment of an industrial AR system in accordance with the disclosure is shown in FIGS. 1A and 1s designated generally by reference character 100. Other embodiments of the industrial AR system 100 in accordance with the disclosure, or aspects thereof, are provided in FIGS. 1B-5, as will be described.

In the example shown, the industrial asset can be a switchgear or the like included in a critical infrastructure, such as an industrial cabinet, machine, or plant. The switchgear may have an associated arc-flash boundary that establishes a danger zone in which incident energy of an arc flash could be beyond a certain risk threshold. For example, in use cases, user interactions with the physical asset via the AR display can include opening/closing circuit breakers and switches, executing transfer operations by a transfer switch, performing tests on large motors or robotics, etc.

While the example shown and described is in the context of an industrial asset, the disclosure is applicable to other physical assets that use AR to provide a live AR display of the physical asset on a user device (local or remote). The disclosure is further applicable to an AR display that allows user interaction with the physical asset via the AR display to cause performance of actions that affect or control components of the physical asset. For example, the physical asset can be a vehicle (land-, air-, or sea-borne), an entertainment system, a security system, a residential system, etc.

Industrial AR system 100 includes a local user device 102, an industrial asset 10, such as an industrial cabinet, machine, or plant, and an enhanced MFA device 104. Each local user device 102 includes an AR interface 110, a memory 114, a camera 112, and an AR interaction application 120, and a device MFA reader 124, all of which are communicatively coupled to a processor 112 via bus paths. Memory 114 can include volatile memory, including a buffer 116, and non-volatile memory configured to store programmable instructions. The local user device 102's processor 112 is configured to execute the programmable instructions, which cause processor 112 to perform the disclosed functions, including controlling the components of local user device 102 to which it is coupled and interactions between these components.

Camera 112 can be a camera integrated with local user device 102 or an external camera physically and/or communicatively coupled to local user device 102. Control of camera 112 includes hardware and/or software used to determine a FOV, operating in coordination with processor 112 and reporting the FOV to AR interaction application 120, e.g., via processor 112. Camera 112 can use a variety of different sensors, such as CMOS active-pixel image sensors, CMOS back-illuminated sensors, a charge-coupled device (CCD), without limitation to a particular type of sensor.

AR interface 110 includes hardware and/or software, such as a touch screen (see display screen 204 in FIG. 2), for displaying and interacting with an AR display output by AR interaction application 120. AR interface 110 is configured to receive user input via the display screen as the user interacts with elements included in the displayed AR. The user can interact with the elements using contact or non-contact user input techniques relative to the display screen (e.g., touching the screen or making gestures adjacent the screen) and/or manipulating a cursor using a cursor control device (e.g., a mouse, joystick, touchpad, keypad) and entering data using an input device (e.g., a keypad). The user interaction can change the AR display, such as by moving or removing a panel or door, to allow a view of previously obscured components 20, e.g., disposed behind the panel or door. The user interaction can further request information about a component 20. The user interaction can further request and effect control of a component 20. AR interface 110 outputs a control request in response to a user interaction requesting control of a component 20.

AR interaction application 120 is configured to communicate and cooperate with AR fulfillment application 130 of asset 10 over a network 140 to facilitate AR functions as disclosed. AR functions include generation (also referred to as rendering) of the AR display, providing the rendered display to AR interface 110 for display, and receiving from AR interface 110 interactive user input received through the AR display. The AR functions further include processing the user input received via AR interface 110 for updating the AR display based on the user input. AR interaction application 120 further receives from camera 112 data about where the camera is pointing and or what camera 112 observes, e.g., about objects in the FOV of camera 112. Data that describes what camera 112 observes and where camera 112 is pointing is referred to in this disclosure as FOV data. The FOV data is used to obtain asset operational data for the AR display.

The AR display is further based on the asset operational data, which includes, for example, the state and/or values associated with actual devices of asset 10 (e.g., circuit breakers, sensors, switches, etc.). The asset operational data can be received from asset 10 or a centralized system (such as a supervisory control and data acquisition (SCADA) system). The asset operational data is used to provide an information overlay that can include values and/or diagrammatical content (such as state of a line (energized or not) using a single-line diagram).

Network 140 can be a private or protected network, such as a local area network (LAN) or a virtual private network (VPN) that uses another network (e.g., a public or private wide area network (WAN) or LAN).

AR interface 110 can be optionally provided, e.g., via network 140, to one or more remote user devices 102R. For the respective remote user devices 102R, its AR interface 110 can display the AR display on a display screen of the remote user device 102R, receive interactive user input as a remote user of the remote user device 102R interacts with the AR display, and output control requests responsive to user interaction with the AR display. The AR display can be updated by the AR interaction application 120. Remote user device 102R can have the same components as local user device 102. However, the camera 112 is not shown, because remote user device 102R does not use a camera component for location awareness associated with the AR display. Additionally, enhanced MFA is performed locally with a local user device 102, not with remote user device 102R. Remote user device 102R uses traditional MFA (e.g., password+token) rather than enhanced MFA.

Authentication controller 122 manages control requests that request control of actual components 20 of asset 10 that have a sensitive status. When a control request is received due to a user interaction with the AR display to control a particular component 20 that has a sensitive status, authentication controller can inform the user that control of the particular component 20 is blocked until proof of enhanced MFA is received. Each control request can be buffered in buffer 116, e.g., held in a queue, until it is verified that the request is either not for a sensitive component 20 or that the control request has been approved via enhanced MFA. Analysis of the control requests for flagging any control request for controlling a sensitive component 20 and approval of the control requests can be performed by the authentication controller 122 or by asset 10's AR fulfillment application 130, or a combination thereof. In either case, once authentication controller 122 is aware that a control request is for a sensitive component 20, it waits for proof of enhanced MFA before allowing the control request to be processed in the AR display.

Enhanced MFA requirements can include verification of enhanced MFA for a local operator proximate asset 10 that aims local user device 102 at asset 10 to provide the FOV data that is used for generating the AR display. Additional requirements for allowing the control request to be processed in the AR display or for controlling a component 20 can include dual MFA in which MFA is used to authenticate at least one additional operator or supervisor that is a user of a remote user device 102R.

Figure 2:
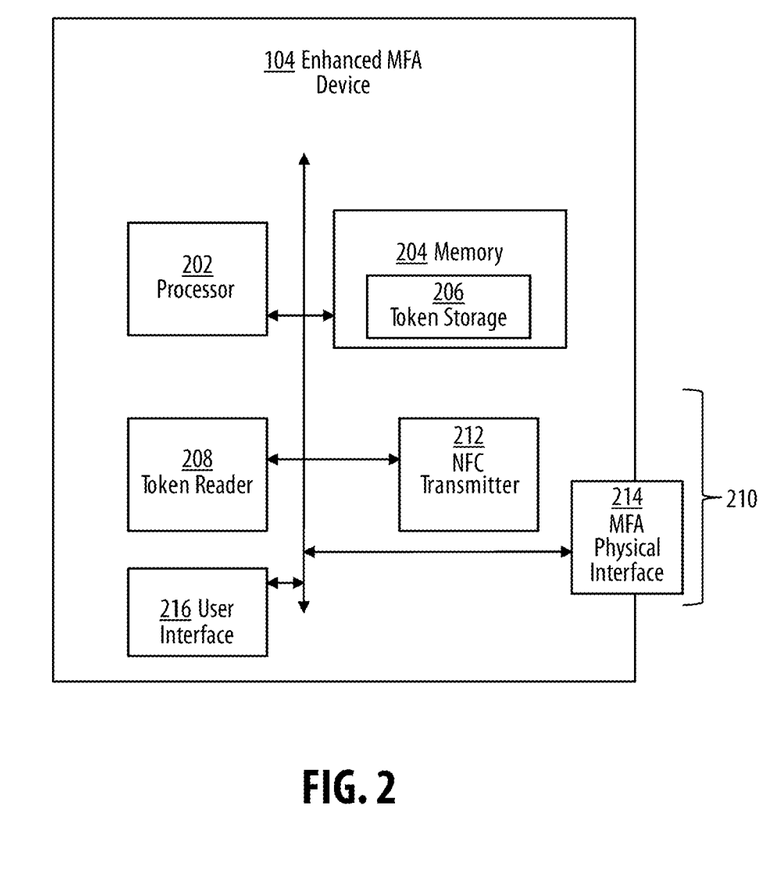
FIG. 2 is a block diagram illustrating an example enhanced multifactor authentication (MFA) device of the AR system of FIG. 1A or FIG. 1B, in accordance with an aspect of the disclosure.

With additional reference to FIG. 2, enhanced MFA device 104 is configured with hardware and software to authenticate a personal factor, such as a biometric factor or a personal knowledge factor, and further to provide a presence factor. The presence factor can be provided as a readable key that can be read by an appropriate reader. Enhanced MFA device 104 includes a memory 204 that stores programmable instructions and further includes token storage 208, a processor 202 configured to execute the programmable instructions, a token reader 208, and proximity interface 210 for outputting the readable key to a proximate reader. The proximity interface 210 can include, for example, a near near-field communication (NFC) transmitter 212 and/or an MFA physical interface 214 (e.g., a universal serial bus (USB) interface or the equivalent), shown as MFA physical interface 214. Enhanced MFA device 104 can optionally include a user interface 216 to optionally prompt the user to present biometric and/or personal knowledge data.

Processor 202 (e.g., a microprocessor, field programmed gate array (FPGA), application specific integrated circuit (ASIC), or the equivalent) is programmed to be registered with a user account and programmed to store a unique token for the user in token storage 206. The unique token can be a biometric token unique to the user (e.g., a representation of a fingerprint, retinal pattern, etc.) or a personal knowledge token (e.g., a passphrase) that can be used to uniquely identify the user. The enhanced MFA device 104 is issued to the user to be carried with them (e.g., on a key ring, clip, etc.).

During an enhanced MFA process, verification is performed that the local user is proximate asset 10 and that the local user is the same person that operates local user device 102 to obtain an AR display based on the FOV of local user device 102's camera 112. First, the local user gains access to local user device 102 such as by MFA, which uses verification of a combination of any of a biometric factor, a personal knowledge factor, and a presence factor. The local user presents enhanced MFA device 104 to asset 10, such as by mating the MFA physical interface 214 with a compatible physical interface of a proximity reader 18 of asset 10 that is fixed to or adjacent to asset 10 and/or by placing enhanced MFA device 104 sufficiently proximate asset 10 such that NFC transmitter 212 can be activated (if not self powered) and the readable key from NFC transmitter 212 can be read by asset 10's proximity reader 18. A transfer of the readable key from enhanced MFA device 104's proximity interface 210 to asset 10's proximity reader 18 establishes that enhanced MFA device 104 is adjacent and/or connected to asset 10, thus verifying a proximity factor, which is a first factor for enhanced MFA.

Processor 202 is further configured to communicate with token reader 208 to receive biometric and/or personal knowledge data within a threshold time of receiving the readable key. The local user can be prompted to input biometric or personal knowledge data for verifying a second factor (biometric factor or personal knowledge factor) via user interface 216 against the unique token stored for the user in token storage 206. The local user presents a biometric feature (e.g., finger or eye) and/or personal knowledge data (e.g., by typing a passphrase) via token reader 208. The second factor is satisfied if the presented biometric feature or personal knowledge data matches the token stored in token storage 206.

Enhanced MFA is satisfied if the first and second factors are verified within the threshold time. Thus, if the threshold time has not yet passed since the second factor was verified, satisfaction of the second factor can be communicated by proximity enhanced MFA device 104's interface 210 to asset 10's proximity reader 18 while establishing the first factor, such as by transmission of a satisfaction code. Receipt of the satisfaction code by proximity reader 18 indicates satisfaction of both the first and second factors.

In one or more embodiments, the enhanced MFA device can only send the satisfaction code after satisfaction of the second factor is established. In one or more embodiments, the enhanced MFA device can be an integral device that is used for establishing satisfaction of both the first and second factors. In one or more embodiments, the enhanced MFA device can be include a first device that establishes satisfaction of the first factor and a second device that establishes satisfaction of the second factor.

With continued reference to FIG. 1A, asset 10 includes a memory 14, AR fulfillment application 130, and controllable components 20, which are all communicatively coupled to a processor 12 via bus paths. Components 20 are actual components of asset 10, and can include sensors and control elements (e.g., valve actuators, motors, heating elements, etc.) that can monitor, provide functionality of, or control aspects of asset 10. Each of components 20 can be either sensitive or not sensitive. In one or more embodiments, all components 20 are sensitive. Enhanced MFA requirements must be satisfied to allow remote control of sensitive components 20 via the AR display. Memory 14 can include volatile memory and nonvolatile memory configured to store programmable instructions. The asset's processor 12 is configured to execute the programmable instructions, which cause processor 12 to perform the disclosed functions, including controlling the components 20 of asset 10 and interactions between these components 20.

In one or more embodiments, a secured component 20 can be an intermediate system, such as a virtualized PLC. The virtualized PLC can receive a request from the local user via the AR display to perform a physical action, in response to which the virtualized PLC would perform discrete operations by executing a script or sequence of programmed instructions for causing control commands to instruct a physical device to perform an action. When the physical device or the action are sensitive and require extended MFA, requests to the virtualized PLC require extended MFA. In an example use case, the sensitive action is a complex transfer operation in which a virtualized PLC controls a transfer operation performed by a physical switch. The request to the virtualized PLC requires extended MFA.

AR fulfillment application 130 is configured to communicate and cooperate with AR interaction application 120 of local user device 102 over network 140 to facilitate AR functions as disclosed. AR fulfillment application 130 receives FOV data via network 140 and provides a rendered AR display that corresponds to the FOV data for interactive AR display by local user device 102's AR interface 110. Additionally, AR fulfillment application 130 receives user interaction data from AR interaction application 120 about user interaction with the AR display, including control requests. AR fulfillment application 130 can flag control requests that are for sensitive components 20. When a control request for a sensitive component 20 is flagged by AR fulfillment application 130 or AR interaction application 120, an authentication supervisor 132 is summoned to prevent transmission of control signals to sensitive components 20 responsive to control requests until enhanced MFA is satisfied.

Authentication supervisor 132 can be included with AR fulfillment application 130 and manage control signals to components 20 responsive to control requests. When a control request is for a sensitive component 20, authentication supervisor 132 requires proof of enhanced MFA before allowing transmission of any control signals to the sensitive component 20. Authentication supervisor 132 can receive proof of enhanced MFA by push or pull notification from enhanced MFA device 104 via processor 12.

In an industrial setting in which harsh conditions exist, since proximity reader 18 is fixed to asset 10 or adjacent asset 10, proximity reader 18 can be provided with rugged construction to withstand the harsh conditions. Proximity reader 18 is configured with software and/or hardware to interface with enhanced MFA device 104's proximity interface 210 to both determine satisfaction of the first factor and to receive the satisfaction code to confirm satisfaction of the second factor. Proximity reader 18 can include a physical port that mates with MFA physical interface 214. An example, without limitation, of the physical port is a USB port. Alternatively or additionally, proximity reader 18 can include an NFC reader that can activate NFC transmitter 212 and can receive data from NFC transmitter 212 for NFC transmission.

In one or more embodiments, the local user can be located behind a transparent protective divider that separates the local user from the harsh conditions, but allows the local user to operate user device 102 with asset 10 within a FOV of camera 112, and operate a secured button (not shown) that is disposed behind the protective divider and is configured to activate MFA using a previously connected USB.

Regulatory restrictions exist for certain assets that do not permit the asset to have a USB. Under such restrictions, proximity reader 18 can be configured as an NFC reader without a USB port.

Processor 12 can be notified by proximity reader 18 upon receipt of a satisfaction code from enhanced MFA device 104, wherein the satisfaction code is proof of satisfaction of enhanced MFA. Once this proof is received by processor 12, AR fulfillment application 130 can notify AR interaction application 120. Authentication supervisor 132 can allow control signals to be provided to the sensitive component 20 per the control request that was authenticated. Authentication controller 122 can update the AR display to inform the user that the requested control has been implemented and to update the AR display in real time to show the implementation of the requested control and its effects.

From the perspective of an operator using local user device 102 or remote user device 102R to perform staged control and request control of one or more sensitive components 20 via the AR display, the control actions can be added to a queue by either local user device 102's AR interaction application 120 or asset 10's AR fulfillment application 130. The queue can be listed and displayed by local user device 102 or the remote user device 102R with the AR display while waiting for enhanced MFA. The operator can enter a commit command for selecting one or more of the queued control requests, at which point the enhanced MFA can be performed for obtaining approval to perform the selected commands. Upon satisfaction of enhanced MFA, the selected control requests are performed.

Figure 1B:
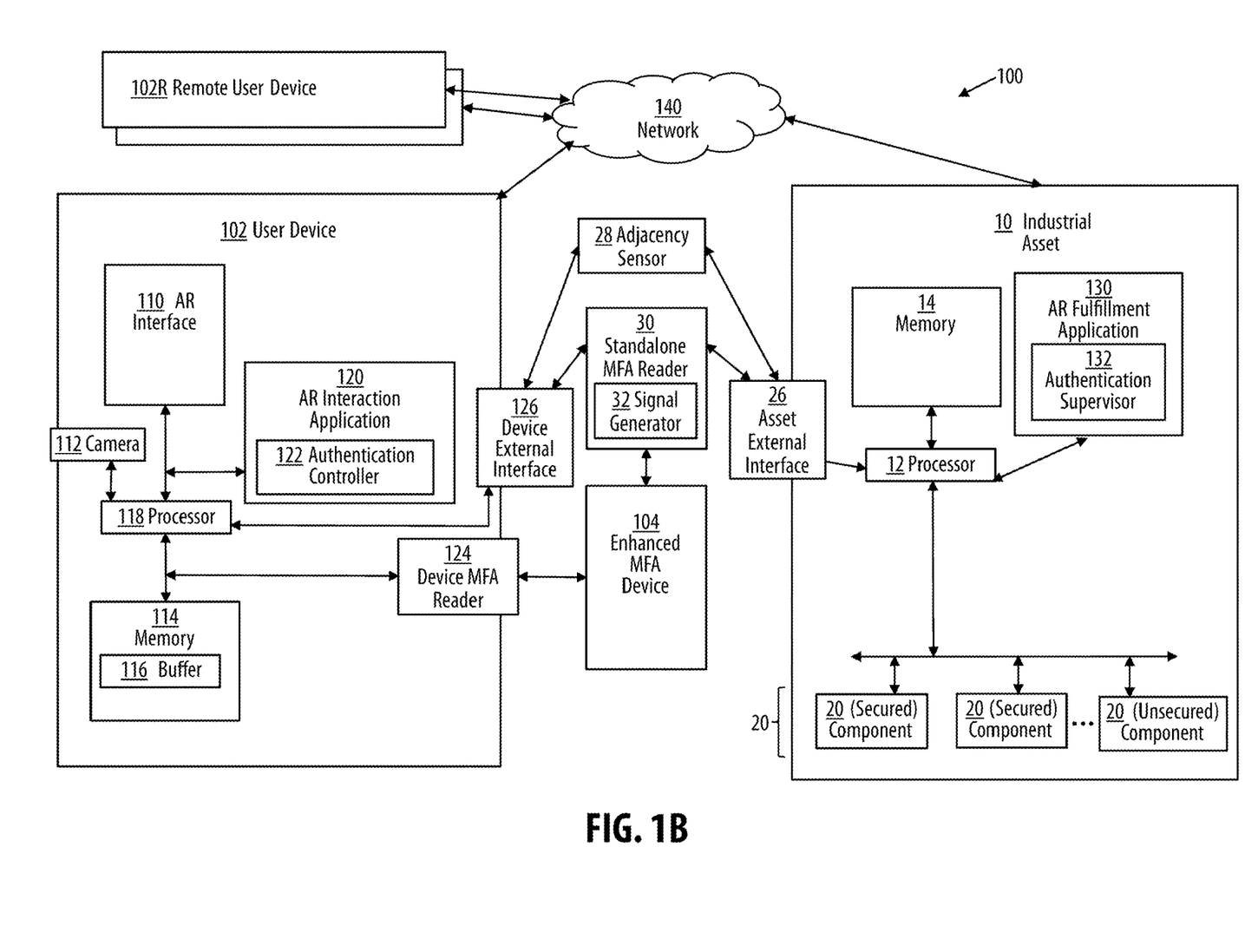
FIG. 1B is a block diagram illustrating the industrial AR system of FIG. 1A, in accordance with another exemplary embodiment of the disclosure.

With reference to FIG. 1B, an embodiment of AR system 100 is shown that includes an adjacency sensor 28 that includes hardware and software to verify that an enhanced MFA reader is within a geolocation range of adjacency sensor 28. The enhanced MFA reader can be embodied as a standalone MFA reader 30 or a device MFA reader 124 that is incorporated into local user device 102. The enhanced MFA reader includes the same configuration as asset 10's proximity reader 18 shown in FIG. 1A, but does not need to have rugged construction. More particularly, the enhanced MFA reader includes software and/or hardware used to read data from enhanced MFA device 104. The data read can be a satisfaction code that includes proof enhanced MFA was successful and/or presence data that includes proof the presence factor was established.

Possible embodiments of AR system 100 can include one or more of proximity reader 18, standalone MFA reader 30, and device MFA reader 124. Adjacency sensor 28 is provided for embodiments that do not use proximity reader 18 exclusively for confirmation of enhanced MFA. Device external interface 126 and asset external interface 26 can be standard components of local user device 102 and asset 10 that are used for communication with any external device, or can be provided particularly for communication with standalone MFA reader 30 and/or adjacency sensor 28.

Enhanced MFA is satisfied when two conditions are satisfied: a) the enhanced MFA reader receives the satisfaction code via a physical interface or an NFC interface (meaning two factors were authenticated), and b) compliance with the geolocation range of the MFA reader is verified by adjacency sensor 28 (also referred to as geolocation verification). Adjacency sensor 28 and/or standalone MFA reader 30 can communicate with local user device 102's processor 118 and/or asset 10's processor 12 via a corresponding external interface, namely device external interface 126 and asset external interface 26, respectively. Device external interface 126 and asset external interface 26 are configured with software and/or hardware needed for communicating with external devices, and are equivalent to input/output (I/O) interface (I/F) 506 shown in FIG. 5. Via the corresponding external interface 26 or 126, local user device 102's processor 118 and/or asset 10's processor 12 can receive confirmation of two-factor authentication from the enhanced MFA reader and geolocation verification from adjacency sensor 28.

Geolocation verification can provide proof of location of the standalone MFA reader 30 or device MFA reader 124 and can be performed using a technique such as connection to one or more access points, geo-fencing, triangulation, etc. The access point(s) can be private access points for preserving security. Once confirmation of both two factor authentication and geolocation verification are received, local user device 102's processor 118 can share confirmation that enhanced MFA is satisfied with authentication controller 122 and/or asset 10's processor 12 can share confirmation that enhanced MFA is satisfied with authentication supervisor 132. Information can be shared as needed between AR fulfillment application 132 and AR interaction application 120 to verify the corresponding control request and for facilitating the interactive AR display and control of a sensitive component 20 responsive to the verified control request.

Figure 3A:
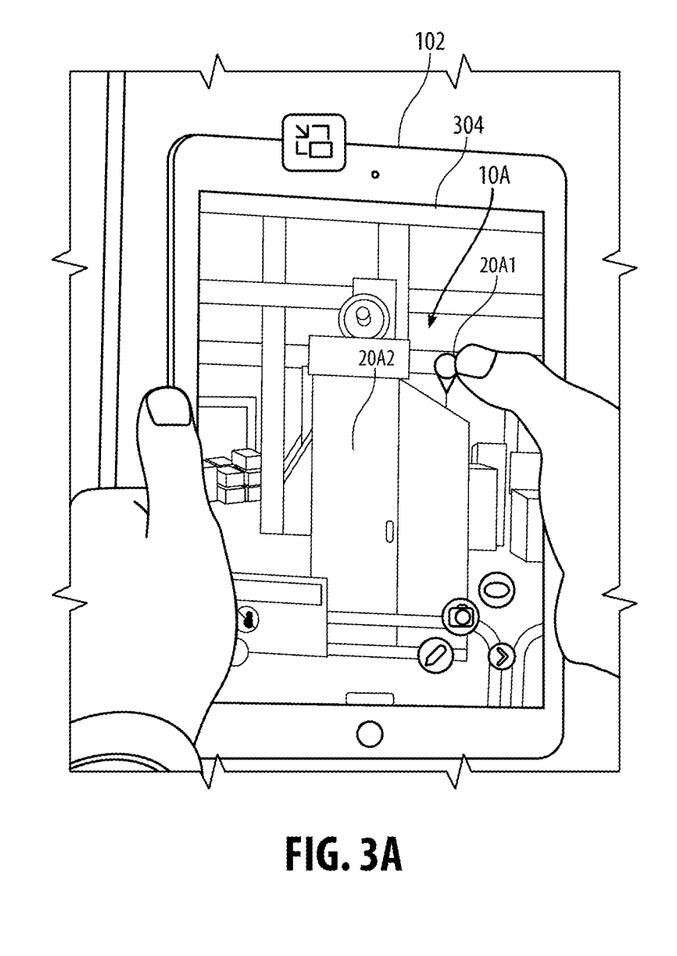
FIGS. 3A and 3B illustrate example display screens of a local user device of the AR system of FIG. 1A or FIG. 1B showing different views of AR displays, in accordance with an aspect of the disclosure.
Figure 3B:
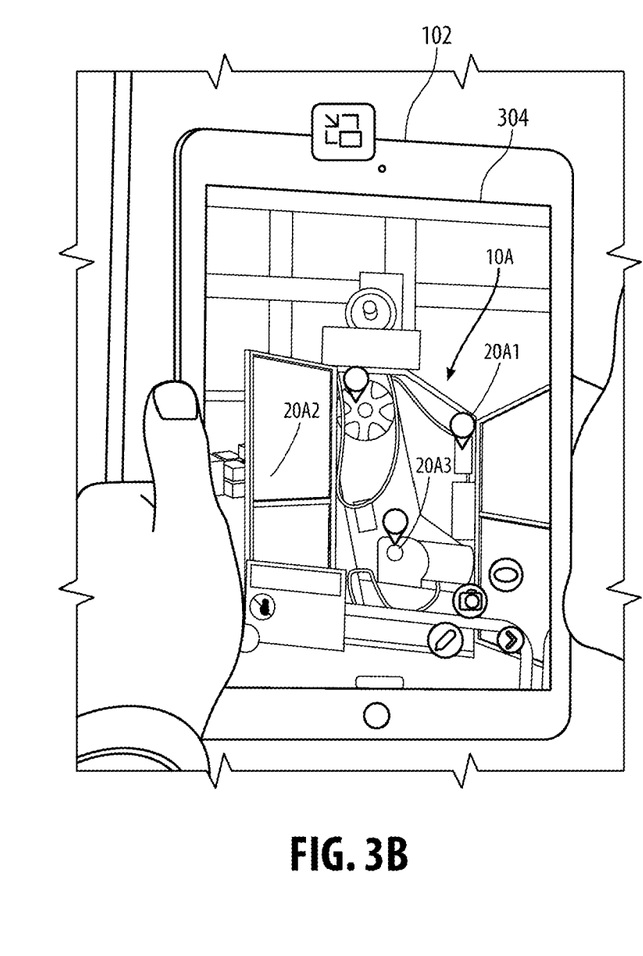

With additional reference to FIGS. 3A and 3B, the local user can operate local user device 102 by directing camera 112 at asset 10. The local user can be required to provide credentials for authentication (e.g., MFA) before having access to local user device 102. An AR display of the region of asset 10 in the FOV of camera 112 is displayed on via AR interface 110. The AR display can include internal components 20 of asset 10, conceptually providing a selectable X-ray view of asset 10. The AR functions cause an image of a virtual asset 10A that corresponds to actual asset 10 to be displayed interactively as AR display 304 on a display screen 302 rendered by AR interface 110.

The display screen 304 can be a display screen of local user device 102. In one or more embodiments, the AR display can be displayed on a display screen of one or more remote user devices 102R. The user of any device that can display the AR display can be required to provide credentials for authentication (e.g., MFA). The AR display can be viewed by a user that functions as a supervisor (also referred to as a supervisor) and/or a user that functions as an operator that submits control requests for controlling components 20 of asset 10 (also referred to as an operator). The supervisor can have authority to permit or block actions by an operator. The operator can have authority to request control of components 20 of asset 10. Different components 20 can require different levels of authority. The authority is verified by the MFA process when accessing the AR display via the device being used. One user can function as both the local user and an operator. A local user and/or an operator may require supervision by a supervisor to perform tasks of sending FOV data for rendering the AR display and/or controlling components 20.

Authentication by MFA to use a device as a local user, operator, or supervisor is different from enhanced MFA. Additionally, receiving permission from a supervisor to perform actions is different from enhanced MFA. A requirement, such as based on an industry standard and/or governmental regulation, may require MFA for each interface with a physical device (including a virtual device that controls a physical device). Control of each sensitive component 20 thus needs the ability to logon to the component 20 or an equivalent authentication. Traditional MFA merely allows a user to logon to a local user device 102 or a remote user device 102R to access the AR display as a local user, an operator, or a supervisor, but does not provide authentication to perform an action on an AR IGE in the AR display that corresponds to a sensitive component 20 for controlling the sensitive component 20 via the AR display.

The ability to obtain authentication for a sensitive component 20 in the FOV of local device 102's camera 112 can be complicated, since different components 20 enter and exit the FOV as camera 112 is pointed in different directions. Due to the dynamic nature of the AR display, a set of components 20 in the FOV of local device 102's camera 112 at a particular moment in time can change over time as the camera 112 changes its FOV by moving and/or zooming in or out. The transient connection with components 20 in the FOV does not allow the ability to establish a session over a useful time interval during which the local user can be logged on to those components 20 included in the FOV.

A solution provided by this disclosure is to use enhanced MFA at a command level for authorizing control of a dynamic set of sensitive components 20 without logging onto the components 20 themselves. An enhanced MFA operation is triggered at the local user device 102 or remote user device 102R by an interaction with an AR IGE in the AR display that corresponds to a sensitive component 20 in the camera 112's FOV, wherein the interaction is a command for controlling the sensitive component 20 that causes generation of a control request.

Accordingly, an enhanced MFA operation can be invoked by signals output by the AR interface 110 of either local user device 102 or remote user device 102R. More specifically, an enhanced MFA operation is invoked in response to AR interface 110 outputting a control request responsive to a user's interaction with an AR IGE 20A of the AR display provided by AR interface 110. This causes authentication controller 122 to buffer the control request in buffer 116 until enhanced MFA is approved. Approval of the enhanced MFA provides proof that a local user of local user device 102 is local. This can require proof of identity and proof of possession factors for the local user at the location of asset 10. Moreover, generation of the AR display relies on local user device 102 being local to asset 10 in order that the FOV overlap components 20 asset 10.

In one or more embodiments shown in FIG. 1B, the enhanced MFA operation can require verification from both user device 102 and asset 10, meaning that each of user device 102 and asset 10 verify at least one feature used for enhanced MFA. For example, device MFA reader and/or device external interface 126 can communicate with one or more of adjacency sensor 28, standalone MFA reader 30, and enhanced MFA device 104 to establish at least one of a biometric factor and a presence factor, and asset external interface 26 can communicate with at least one of standalone MFA reader and adjacency sensor 28 to verify at least one of a biometric factor and a presence factor.

Enhanced MFA authenticates the local user (using a first factor, namely a biometric or personal knowledge factor) while the local user is using a local user device 102 that is authenticated (using a second factor, namely a presence factor) as being local to asset 10. The first and second factors must be obtained at the same time or within a predetermined time window. The authentication to control the sensitive component 20 can be effective for a predetermined time interval, even if the FOV changes to temporarily not include the sensitive component 20.

The scope of permission granted by successful enhanced MFA can vary based on administrative preference. The scope can be for a single command submitted via the AR display for a single sensitive component 20 for a predetermined time period, for commands for the single sensitive component 20 submitted within a predetermined time period (e.g., until occurrence of a timeout event), for commands for controlling any components 20 of a group of sensitive components 20 (e.g., all sensitive components 20 in the FOV at the time the control request that have a sensitivity level that does not exceed a particular sensitivity level), or for indefinite control of the single sensitive component 20 or the group of sensitive components until a timeout event due to inactivity for a predetermined time period.

The user (local user, operator, supervisor) can interact with AR display 304 to interact with actual asset 10, such as by using touch or contactless gestures to select an AR IGE 20A of virtual asset 10A that corresponds to an actual component 20 of asset 10. The interaction can include, for example, viewing data about operation and/or status of the selected actual component 20, such as superimposition on the displayed AR IGE 20A of current data output by the selected actual component 20 in real time, and/or superimposition of other informational virtual objects on the displayed AR IGE 20A.

AR display 304 can show an internal view of actual asset 10 and its components 20 by request and/or by moving an AR IGE 20A to expose an internal region of actual asset 20. For example, a selected AR IGE 20A can be manipulated, such as to cause superimposition of associated information on AR display 304 about a corresponding actual component or to move positioning of an AR IGE 20A (e.g., to remove a panel or open a door) to view additional AR IGEs 20A that are behind the selected AR IGE 20A. FIG. 3A shows an example in which the user interacts with a virtual AR IGE 20A1 for a virtual control panel door 20A2 in AR display 304 to virtually manipulate the virtual AR IGE 20A1 to cause the virtual control panel door 20A2 to open, as shown in FIG. 3B. Once opened, virtual AR IGE 20A3 that corresponds to an actual component disposed behind an actual control panel door of asset 10 that corresponds to virtual control panel door 20A2 are exposed in AR display 204.

However, this manipulation of AR IGE 20A is virtual and does not affect any actual components 20 of actual asset 10. Manipulation of actual components 20 via AR display 304 has security concerns, which can include a need to satisfy regulatory requirements, and meet standards (e.g., global cybersecurity standard IEC/ISA-62443), which can include proper authentication of access to all secured components 20.

This disclosure provides a system and method configured to facilitate staged control of actual components 20 by operator interaction with AR display 304, with application of enhanced MFA in response to any staged control that involves a sensitive component. The operator can select a controllable AR IGE 20A that corresponds to a controllable actual component 20. The operator can request control of the controllable actual component 20 via AR display 304. For example, when the controllable AR IGE 20A is selected, a control menu with control functions for controlling the controllable actual component 20 (referred to as the selected controllable actual component 20) can be provided to the operator. The control menu can be displayed (e.g., in a pop-up window, on a side panel, etc.) when hovering over or right clicking on controllable AR IGE 20A, or by other techniques that are known or will be developed in the future. When the operator selects a control function for controlling controllable AR IGE 20A, a control request is generated.

Before control of the selected controllable actual component 20 is allowed, a determination is made whether controllable actual component 20 is designated as sensitive. If the controllable actual component 20 is determined to be sensitive, control of the selected controllable actual component 20 is withheld until enhanced MFA requirements are met. For example, a generated control request is held in a buffered queue and is not processed until the enhanced MFA requirements are met, and/or access to the control menu for generating a control request is delayed until the enhanced MFA requirements are met. The buffered queue can be held in buffer 116 of local user device 102 or remote user device 102R and controlled by authentication controller 122. Alternatively, the buffered queue can be held in a buffer included in memory 14 of asset 10 and controlled by authentication supervisor 132. In a dual MFA scenario, e.g., that involves at least two different users (an operator and/or supervisor, in addition to the local user), MFA can be required for each of the users. Enhanced MFA can be required for the local user to prove the local user (with the local user device 102 being used) is disposed at the location of asset 10. The other users may be remote from asset 10, e.g., outside of a geolocation range, not in range to obtain asset 10 in a FOV, in a different room, different building, or miles away (e.g., in a different country) from asset 10.

Figure 4:
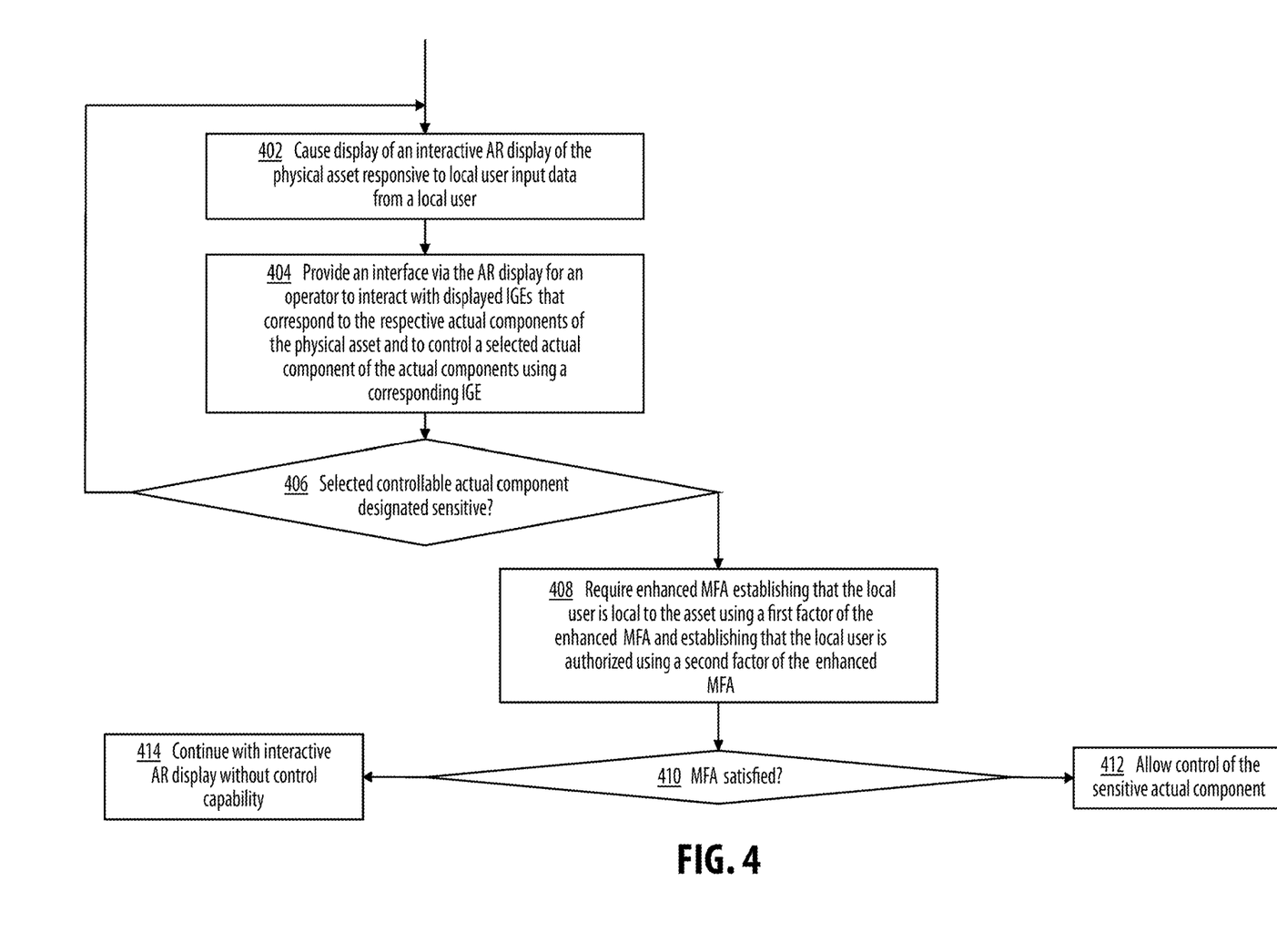
FIG. 4 is a flowchart of an example method performed by an authentication controller of a local user device and/or an authentication supervisor of an industrial asset shown in FIG. 1A or FIG. 1B, in accordance with an aspect of the disclosure.

With reference now to FIG. 4, shown are flowcharts demonstrating implementation of the various exemplary embodiments. It is noted that the order of operations shown in FIG. 4 is not required, so in principle, the various operations may be performed out of the illustrated order. In addition, certain operations may be skipped, different operations may be added or substituted, some operations may be performed in parallel instead of strictly sequentially, or selected operations or groups of operations may be performed in a separate application following the embodiments described herein.

Language that refers to the exchange of information is not meant to be limiting, and can include reading, push, or pull of data. FIG. 4 shows a flowchart 400 of a method performed by a user device's authentication controller (such as local or remote user device 102 or 102R's authentication controller 120) and/or a physical asset's authentication supervisor (such as asset 10's authentication supervisor 110) shown in FIG. 1A or 1B.

The method begins at block 402, in which an interactive AR display of the physical asset is caused to be displayed responsive to local user input data from a local user and asset operational data from the asset or a SCADA. The local user input data can be FOV data that represents the location at which a camera is pointing and/or the FOV of the camera when the FOV overlaps at least a portion of the asset. The AR display corresponds to the FOV data, meaning in response to a change of the camera's FOV, the AR display is updated to correspond to the camera's FOV.

At block 404, an interface is provided via the AR display for an operator to interact with displayed AR IGEs that correspond to the respective actual components of the physical asset. The interface is configured for the operator to control a selected actual component of the actual components using a corresponding AR IGE. The operator can be the local user or a different user. At block 406, a determination is made, responsive to detected user activity corresponding to AR IGE, whether the selected controllable actual component is designated as sensitive. The default can be that all components are sensitive and that enhanced MFA will be triggered when request of any component is selected.

At block 408, responsive to a determination that the selected controllable actual component is designated as sensitive (including by default), enhanced MFA is required for establishing that the local user is local to the asset using a first factor (a presence factor) and a second factor of the enhanced MFA (e.g., a biometric factor or a personal knowledge factor). In one or more embodiments, the first and second factors can be verified using a single discrete authentication device, such as an authentication device that includes a USB mating interface or an NFC interface. The satisfaction code can be provided by the authentication device for satisfaction of both factors. The authentication device can also include means for entering personal knowledge or biometric data that establishes the identity of the local user. When the authentication device is a single integral device, establishment of both factors within a predefined time window establishes that the authenticated local user is present with the authentication device.

At block 410, upon receipt of proof of authentication of the local user by the enhanced multifactor authentication, control of the sensitive actual component is allowed.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
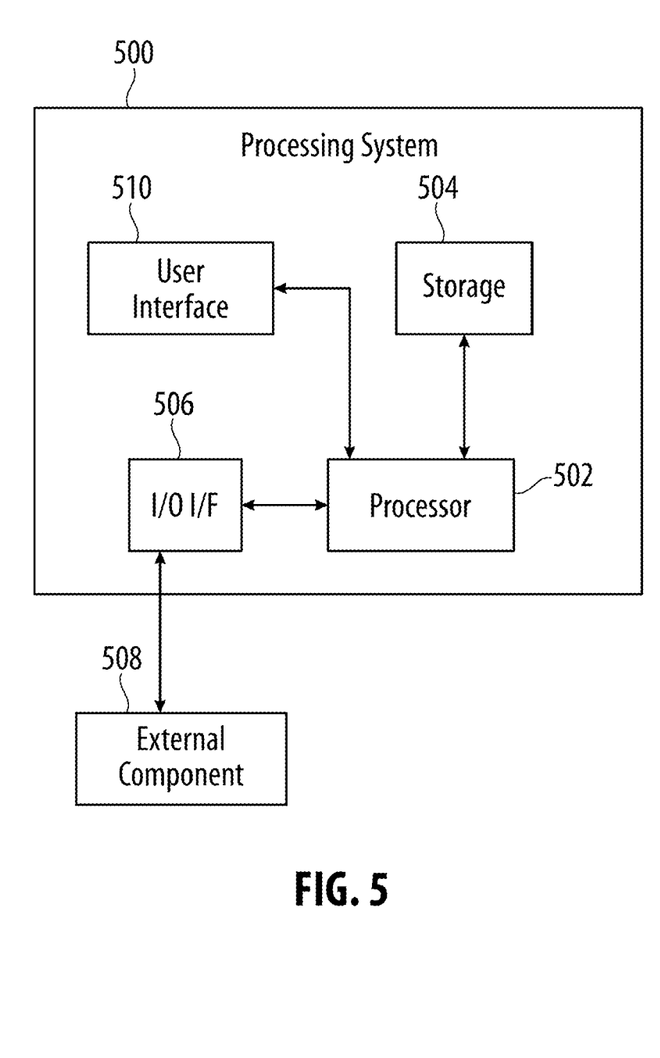
FIG. 5 illustrates an example computing system that could be used to implement computing systems of the local user device and the industrial asset shown in FIG. 1A or FIG. 1B.

With reference to FIG. 5, a block diagram of an example computing system 500 is shown, which provides an example configuration of computing systems of user devices 102 and 102R and asset 10. Additionally, all or portions of the computing systems of user devices 102 and 102R and asset 10 could be configured as software, and computing system 500 could represent such portions. Computing system 500 is only one example of a suitable system and is not intended to suggest any limitation as to the scope of use or functionality of embodiments of the disclosure described herein. Computing system 500 can be implemented using hardware, software, and/or firmware. Regardless, computing system 500 is capable of being implemented and/or performing functionality as set forth in the disclosure.

Computing system 500 is shown in the form of a general-purpose computing device. Computing system 500 includes a processing device 502, memory 504, an I/O I/F 506 that can communicate with an internal component, such as a user interface 510, and optionally an external component 508.

The processing device 502 can include, for example, a PLOD, microprocessor, DSP, a microcontroller, an FPGA, an ASIC, and/or other discrete or integrated logic circuitry having similar processing capabilities.

The processing device 502 and the memory 504 can be included in components provided in the FPGA, ASIC, microcontroller, or microprocessor, for example. Memory 504 can include, for example, volatile and non-volatile memory for storing data temporarily or long term, and for storing programmable instructions executable by the processing device 502. Memory 504 can be a removable (e.g., portable) memory for storage of program instructions. I/O I/F 506 can include an interface and/or conductors to couple to the one or more internal components 510 and/or external components 508.

Embodiments of the computing systems of user devices 102 and 102R and asset 10 may be implemented or executed by one or more computer systems, such as a microprocessor. In various embodiments, computer system 500 may include one or more of a microprocessor, an FPGA, ASIC, microcontroller, or the like. The computer system 500 can be provided as an embedded device. Portions of the computer system 500 can be provided externally, such as by way of a centralized computer or the like.

Computer system 500 is only one example of a suitable system and is not intended to suggest any limitation as to the scope of use or functionality of embodiments of the disclosure described herein. Regardless, computer system 500 is capable of being implemented and/or performing any of the functionality set forth hereinabove.

Computer system 500 may be described in the general context of computer system-executable instructions, such as program modules, being executed by a computer system. Generally, program modules may include routines, programs, objects, components, logic, data structures, and so on that perform particular tasks or implement particular abstract data types.

Potential advantages provided by AR system 100 shown and described include provision of security to facilitate secured control of physical components of a physical asset by interacting with an AR display of the physical asset. Enhanced MFA is invoked in response to a control request generated via a local or remote user's interaction with the AR display, allowing the user to securely communicate and control different physical components of the physical asset from a safe distance (e.g., not outside of the arc flash boundary and/or without need to open a protective cabinet). Invocation of enhanced MFA at the command level avoids a need for the user to logon separately onto each individual physical component to control its operations, thus providing a more fluid user experience.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

I claim:

1. A method of authenticating control of a physical asset that has actual components, the method comprising:
   causing display of an interactive augmented reality (AR) display of the physical asset responsive to local user input data from a local user;
   providing an interface via the AR display for an operator to interact with displayed interactive graphical elements (IGEs) that correspond to the respective actual components of the physical asset, wherein the interface is configured for the operator to control a selected actual component of the actual components using a corresponding IGE, the operator being the local user or a different user;
   determining, responsive to detected user interaction with the corresponding IGE, whether the selected controllable actual component is designated as sensitive;
   responsive to a determination that the selected controllable actual component is designated as sensitive, requiring enhanced multifactor authentication (MFA) to allow the AR display to provide the interface between the operator and the selected controllable actual component for controlling the selected controllable actual component, the enhanced MFA establishing that the local user is physically located local to the asset using a first factor of the enhanced MFA and establishing that the local user is authenticated using a second factor of the enhanced MFA; and
   allowing control of the sensitive actual component based on receipt of proof of authentication of the local user by the enhanced multifactor authentication.

2. The method of claim 1, wherein
   the local user input data includes field of view (FOV) data that represents the FOV of a camera when the FOV overlaps at least a portion of the asset, and
   the AR display corresponds to the FOV data.

3. The method of claim 1, wherein it is unsafe, impracticable, or impossible to physically access the controllable actual component for controlling the controllable actual component, wherein the actual components include first actual components that are designated as sensitive and second actual components that are not designated as sensitive.

4. The method of claim 1, wherein one or more of the first and second factors for the enhanced multifactor authentication includes a personal possession factor, a biometric factor, or a personal knowledge factor.

5. The method of claim 1, wherein the first and second factors are verified using a single discrete authentication device.

6. The method of claim 1, wherein the enhanced MFA requires that establishing the first and second factors occur within a predefined time window.

7. The method of claim 1, wherein
   the operator is the different user, and one of the local user and the operator supervises the other of the local user and the operator and provides approval that is required for controlling the sensitive actual component, or
   the different user includes a first and a second different user, the operator is the first different user and a supervisor is the second different user, and the supervisor supervises the operator and provides approval that is required for controlling the sensitive actual component, or
   the different user includes a first and a second different user, the operator is the first different user and a supervisor is the second different user, one of the local user and the operator supervises the other of the local user and the operator and provides approval that is required for controlling the sensitive actual component, and the supervisor supervises the operator or the local user by providing approval for the operator or local user to supervise the other of the local user and the operator.

8. The method of claim 1, wherein one of the first and second factors is verified by a device that provides the local user input data, and the other of the first and second factors is verified by the physical asset.

9. An augmented reality (AR) system, the AR system comprising:
a memory configured to store a plurality of programmable instructions; and
a processing device in communication with the memory, wherein the processing device, upon execution of the plurality of programmable instructions is caused to:
cause display of an interactive augmented reality (AR) display of the physical asset responsive to local user input data from a local user;
provide an interface via the AR display for an operator to interact with displayed interactive graphical elements (IGEs) that correspond to the respective actual components of the physical asset, wherein the interface is configured for the operator to control a selected actual component of the actual components using a corresponding IGE, the operator being the local user or a different user;
determine, responsive to detected user interaction with the corresponding IGE, whether the selected controllable actual component is designated as sensitive;
responsive to a determination that the selected controllable actual component is designated as sensitive, require enhanced multifactor authentication (MFA) to allow the AR display to provide the interface between the operator and the selected controllable actual component for controlling the selected controllable actual component, the enhanced MFA establishing that the local user is local to the asset using a first factor of the enhanced MFA and establishing that the local user is authenticated using a second factor of the enhanced MFA; and
allow control of the sensitive actual component based on receipt of proof of authentication of the local user by the enhanced multifactor authentication.

10. The AR system of claim 9, wherein
the local user input data includes field of view (FOV) data that represents the FOV of a camera when the FOV overlaps at least a portion of the asset, and
the AR display corresponds to the FOV data.

11. The AR system of claim 9, wherein it is unsafe, impracticable, or impossible to physically access the controllable actual component for controlling the controllable actual component.

12. The AR system of claim 9, wherein one or more of the first and second factors for the enhanced multifactor authentication includes a personal possession factor, a biometric factor, or a personal knowledge factor.

13. The AR system of claim 9, wherein the first and second factors are verified using a single discrete authentication device.

14. The AR system of claim 9, wherein the enhanced MFA requires that establishing the first and second factors occur within a predefined time window.

15. The AR system of claim 9, wherein
the operator is the different user, and one of the local user and the operator supervises the other of the local user and the operator and provides approval that is required for controlling the sensitive actual component, or
the different user includes a first and a second different user, the operator is the first different user and a supervisor is the second different user, and the supervisor supervises the operator and provides approval that is required for controlling the sensitive actual component, or
the different user includes a first and a second different user, the operator is the first different user and a supervisor is the second different user, one of the local user and the operator supervises the other of the local user and the operator and provides approval that is required for controlling the sensitive actual component, and the supervisor supervises the operator or the local user by providing approval for the operator or local user to supervise the other of the local user and the operator.

16. The AR system of claim 9, wherein one of the first and second factors is verified by a device that provides the local user input data, and the other of the first and second factors is verified by the physical asset.

17. A non-transitory computer readable storage medium and one or more computer programs embedded therein, the computer programs comprising instructions, which when executed by a computer system, cause the computer system to:
cause display of an interactive augmented reality (AR) display of the physical asset responsive to local user input data from a local user;
provide an interface via the AR display for an operator to interact with displayed interactive graphical elements (IGEs) that correspond to the respective actual components of the physical asset, wherein the interface is configured for the operator to control a selected actual component of the actual components using a corresponding IGE, the operator being the local user or a different user;
determine, responsive to detected user interaction with the corresponding IGE, whether the selected controllable actual component is designated as sensitive;
responsive to a determination that the selected controllable actual component is designated as sensitive, require enhanced multifactor authentication (MFA) to allow the AR display to provide the interface between the operator and the selected controllable actual component for controlling the selected controllable actual component, the enhanced MFA establishing that the local user is local to the asset using a first factor of the enhanced MFA and establishing that the local user is authenticated using a second factor of the enhanced MFA; and
allow control of the sensitive actual component based on receipt of proof of authentication of the local user by the enhanced multifactor authentication.

18. The non-transitory computer readable storage medium of claim 17, wherein,
the local user input data includes field of view (FOV) data that represents the FOV of a camera when the FOV overlaps at least a portion of the asset, and
the AR display corresponds to the FOV data.

19. The non-transitory computer readable storage medium of claim 17, wherein the first and second factors are verified using a single discrete authentication device.

20. The non-transitory computer readable storage medium of claim 17, wherein one of the first and second factors is verified by a device that provides the local user input data, and the other of the first and second factors is verified by the physical asset.

* * * * *